March 13, 1928.
V. I. ZELOV
1,662,096
FLUID PRESSURE OPERATED VEHICLE BRAKE
Filed Feb. 17, 1926
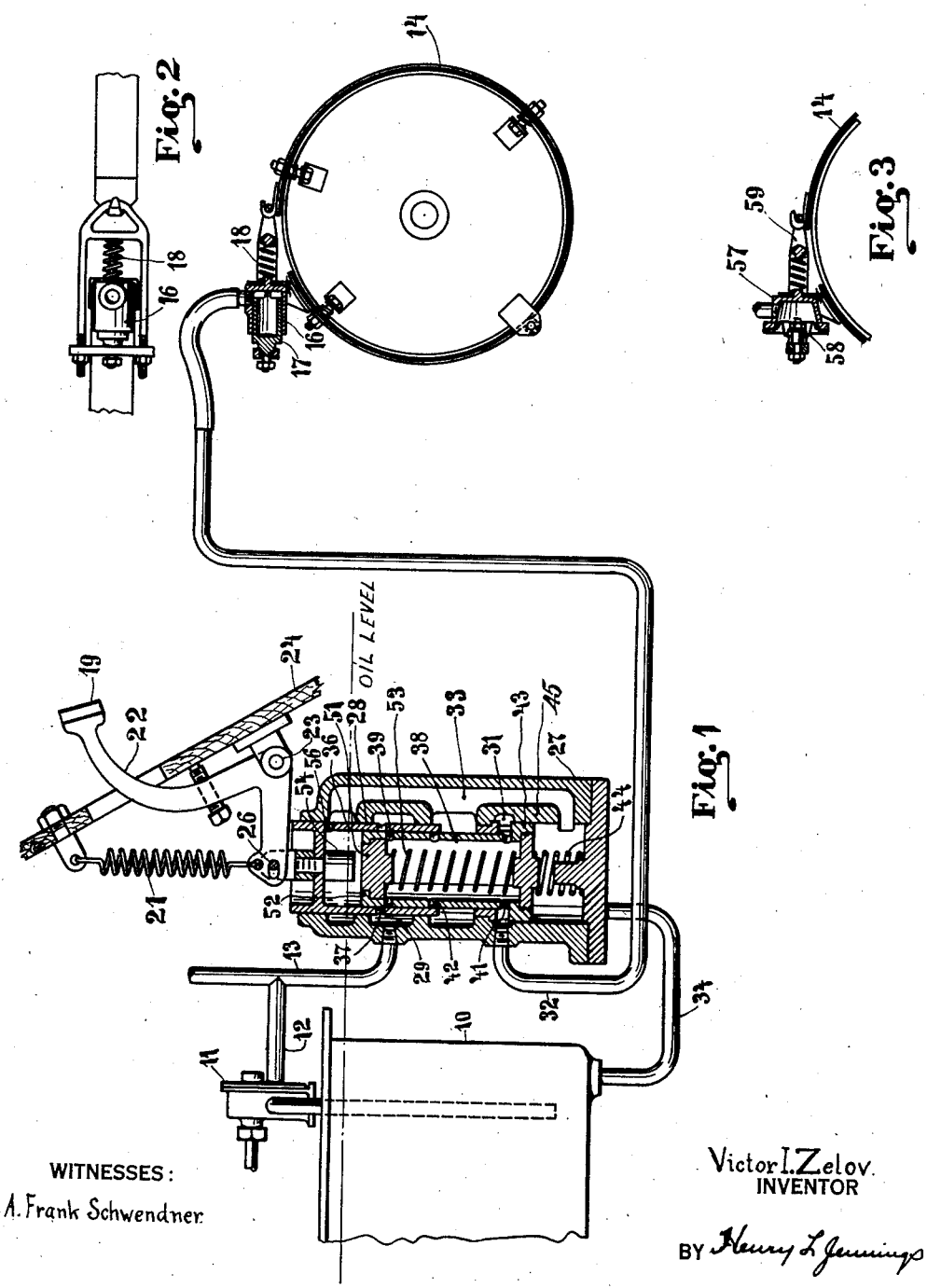
WITNESSES:
A. Frank Schwendner
Victor I. Zelov.
INVENTOR
BY Henry L. Jennings
ATTORNEY Patented Mar. 13, 1928.

1,662,096

UNITED STATES PATENT OFFICE.

VICTOR I. ZELOV, OF ROSEMONT, PENNSYLVANIA.

FLUID-PRESSURE-OPERATED VEHICLE BRAKE.

Application filed February 17, 1926. Serial No. 88,722.

My invention relates to vehicle brakes, more particularly to fluid pressure operated vehicle brakes, and has for an object the provision of apparatus of the character designated which shall effect a positive and definite operation of the brakes under widely varying conditions.

A particular object of my invention is to provide a hydraulically operated vehicle brake wherein is embodied a fluid pressure transformer device adapted to operate in conjunction with a source of fluid under pressure and the brake operating means of a vehicle and which shall be effective to provide a definite graduated braking pressure for each position of the operating means.

A further object of my invention is to provide a fluid pressure transformer device for a hydraulically operated vehicle brake which shall be adapted to normally operate in conjunction with a source of fluid pressure and be effective to provide a predetermined braking force for each position of an operating element of the transformer device and which shall embody means, effective upon failure of the source of fluid pressure, to enable the operator to develop a pressure for applying the brake.

In the accompanying drawing forming a part of this application, Fig. 1 is a view in sectional elevation of my improved pressure transformer device, with a diagrammatic showing of its application to an automobile brake; Fig. 2 is a plan view of the brake cylinder and its connection to the brake of an automobile; and Fig. 3 is a view of a modified form of brake cylinder for employment therewith.

Briefly my invention embodies a source of fluid pressure, such as a pump which develops a definite minimum pressure above which the pressure may or may not vary with the speed of its driving means, a brake cylinder and piston or its equivalent for applying the brake, and I interpose between the pump and the brake cylinder a fluid pressure transformer device. The transformer device may be operated by the ordinary automobile brake pedal and, within normal ranges of pressure developed by the pump, delivers a definite pressure to the brake cylinder upon depression of the pedal and movement of the operating element of the transformer device. When pressure on the brake pedal is released the pressure within the brake cylinder is relieved and fluid flows back to the fluid reservoir. In order that there shall be no failure of the brakes upon a failure in pressure, I have incorporated in the transformer a means whereby pressure may be developed in the transformer itself by the operator by the exertion of force on the pedal.

Referring now to the drawings for a better understanding of my invention, I show in Fig. 1 at 10 a fluid reservoir, such for example as the crank case of an automobile. A pump 11 is associated with the reservoir and develops fluid under pressure which is delivered therefrom through a conduit 12 and a branch conduit 13. The conduit 12 may deliver fluid under pressure to other parts of the vehicle, not shown.

At 14 is shown a well known form of vehicle brake which is applied by means of fluid under pressure in a brake cylinder 16 having a piston 17 disposed therein. When pressure is relieved from the brake cylinder the piston 17 is returned to normal position by means of a spring 18 and the brake is released. The brake is operated by means of a brake pedal 19 which is normally held in a retracted position by means of a spring 21. As will become apparent in the further description of my invention the spring 21 normally offers the only resistance to the application of the brake by the operator. This resistance increases as the pedal is depressed, thus furnishing a graduated increased resistance or "feel" to the application of the brake. The brake pedal is formed on one end of a lever 22 which is pivoted at 23 to a stationary member 24. The other end of the lever connects at 26 to an operating element of my improved transformer device which will now be described.

The transformer device comprises a housing 27 which is, as shown by the broken line in Fig. 1, located so that its major portion is below the normal level of oil in the reservoir 10 in order that its interior parts will be submerged in fluid at all times. The housing 27 defines a cylinder 28 having a passage 29 communicating with the conduit 13 and the source of fluid pressure. A second passage 31 formed in the housing 27 communicates through a conduit 32 with the brake cylinder 16. A third passage 33 forms an exhaust passage and communicates with the fluid reservoir through a conduit 34.

Closely fitting within the cylinder 28 and adapted to reciprocate therein is a cylindrically shaped valve member 36 which is connected to the brake pedal lever 22 at 26. A series of admission ports 37 are provided in the valve member 36 and communicate at all times with the source of fluid pressure through the conduit 13 and passage 29. The inner part of the valve member 36 forms a cylinder in which is disposed a second hollow valve member 38. The valve member 38 is provided with a series of admission ports 39 adapted, when the valve member 36 is moved downwards, to communicate with the admission ports 37 and permit fluid under pressure to pass within the valve member 38. A series of discharge ports 41 are provided in the lower end of the valve member 38 and communicate at all times with the passage 31 and brake cylinder 16 through the conduit 32.

Between the admission ports 39 and the discharge ports 41 there is provided in the valve member 38 a series of exhaust ports 42 which, normally, are substantially covered by the lower end of the valve member 36. When uncovered by the valve member 36 the exhaust ports 42 communicate with the exhaust passage 33 and permit fluid under pressure to pass from the brake cylinder 16 back to the fluid reservoir through the conduit 34.

At the lower end of the housing 27 is a cylinder 45, larger in diameter than the valve member 38. The cylinder 45 communicates at all times through the passage 31 with the brake cylinder 16 and the pressure therein is always equal to the brake cylinder pressure. Formed on the lower end of the valve member 38 is a piston member 43 which operates in the cylinder 45 and which is subjected, on its upper side to the brake cylinder pressure from the passage 31. When the brake is applied, the brake cylinder pressure tends to force the piston 43 and valve member 38 downwardly. Opposing the brake cylinder pressure acting on the piston 43 is a spring 44 which is of sufficient scale to provide the desired braking pressure per unit of movement of the valve member 36.

The operation of the apparatus so far described is as follows. Assume first that the pump 11 is running and delivering pressure through the conduit 13 to the pressure transformer device and that it is desired to set the brake. The pedal 19 is depressed slightly, pushing the valve member 36 downwardly and bringing the ports 37 and 39 in registry. Fluid under pressure now flows through the ports 37, 39 and 41 and through the conduit 32 to the brake cylinder 16. The fluid pressure within the valve member 38 and the brake cylinder 16 now acts on the piston 43 and forces the piston downwardly until the ports 37 and 39 are out of registry when fluid under pressure ceases to flow to the brake cylinder 16. The pressure now in the brake cylinder 16 is determined by the scale of the spring 44, or the force required to deflect it a distance equivalent to the movement of the valve member 36.

Should there be, for any reason, leakage in the brake cylinder or its communications, pressure on top of the piston 43 decreases and the spring 44 moves it and the valve member 38 upwardly, again putting the ports 37 and 39 in registry and permitting fluid under pressure to flow to the brake cylinder 16, maintaining the pressure therein at the desired value and compensating for the leakage. If it be desired to set the brake harder, the pedal 19 is further depressed allowing more fluid to flow to the brake cylinder in the manner already described until the pressure therein is sufficient to force the piston 43 downwardly and again put the ports 37 and 39 out of registry.

It may thus be seen that there is a definite increment of pressure for each downward movement of the outer valve member 36, said increment being determined by the scale of the spring 44. It will furthermore be apparent that the pressure delivered to the brake cylinder 16 is independent of the pressure developed by the pump 11 so long as the pressure developed by the pump is greater than the brake cylinder pressure. Thus the source of pressure may vary widely and the pressure in the brake cylinder still be a definite value depending on the position of the valve member 36 and the deflection of the spring 44.

When it is desired to release the brake, pressure on the brake pedal 19 is released and the spring 21 returns it to normal position raising the valve member 36 to its highest position. In this movement the exhaust ports 42 are uncovered and fluid from the interior of the valve member 38 flows through said ports to the passage 33 and from thence back to the fluid reservoir through the conduit 34, relieving the pressure in the brake cylinder.

It will be observed, from the operation of the apparatus so far descibed, that the setting of the brake is dependent on a source of fluid under pressure. In order that there shall be no failure of braking power when the pump 11 is not developing pressure, I have provided a substantially fluid tight closure member 51 for the upper end of the valve member 38 in the form of a piston or plunger which seats against a suitably flanged portion 52 at the upper end of the valve member 38. The closure member 51 slides freely in the cylindrical interior of the valve member 38 and is normally held in place by a relatively light spring 53. Within the interior of the valve member 36 is provided a boss or projection 54 which, when the pump 11 is developing pressure and the brake is being operated thereby, is clear of the closure member 51.

Should there be a failure of fluid pressure, or when the pump 11 is idle, when the pedal 19 is depressed sufficiently to place the ports 39 and 37 in registry, the brakes are not applied. Due to the location of the transformer device below the normal level of fluid in the reservoir 10, however, the braking system including the interior of the valve member 38, the conduit 32 and the brake cylinder 16 are full of fluid. Further movement of the valve member 36 by the exertion of force on the brake pedal moves the ports 37 and 39 out of registry and the boss 54 engages with the closure member 51 forcing it downwardly and forcing the fluid ahead of it outwardly through the ports 41 toward the brake cylinder, developing a pressure therein and applying the brake. Upon a release of force acting on the brake pedal 19 the brake is instantly released. Should there be a slight leakage by the closure member 51, it is free to pass to the exhaust through a port 56 provided in the upper end of the valve member 36 communicating with the exhaust passage 33. The port 56 furthermore insures that the valve member 36 is balanced at all times and that the only resistance to normal application of the brakes is the spring 21, said spring providing a graduated resistance or "feel" to the application of the brake.

While I have used the terms "brake cylinder" and "piston" in describing the means of application of the brake throughout this specification it should be understood that the particular form of pressure utilizing appliance in the setting of the brake is no part of my invention except in combination with other features and the term is employed herein and in the claims in its generic sense, intended to cover equivalent apparatus. For example, I show in Fig. 3 a well known form of brake cylinder 57 having therein a fluid tight piston element in the form of a flexible diaphragm 58. Fluid under pressure flowing into the cylinder 57 acts upon the piston or diaphragm member 58 and forces it to the left as shown in the drawing. Movements of the piston or diaphragm member 58 may be transmitted to the brake through the medium of a rod 59.

From the foregoing it will be apparent that I have invented an improved hydraulically operated vehicle brake effective normally to apply the brake with a force determined by the degree of movement of an operating element thereof, and embodying means whereby, upon a failure of pressure at the source, the operator may, by the exertion of force on the brake pedal develop pressure in the transformer device for applying the brake.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. The combination with a hydraulically operated vehicle brake embodying a brake cylinder for applying and releasing the brake, of a source of fluid pressure, a valve member having ports communicating with the source of fluid pressure, a second valve member having ports communicating with the brake cylinder, and other ports adapted upon actuation of the first mentioned valve member to communicate with the ports of said first mentioned valve member, means for actuating the first mentioned valve member to place the ports in communication and permit the flow of fluid under pressure to the brake cylinder, and pressure responsive means for actuating the second mentioned valve member and placing the ports out of communication upon the attainment of a pressure in the brake cylinder determined by the position of the first mentioned valve member.

2. In a vehicle brake, the combination of means for developing fluid pressure, a brake cylinder, a brake pedal, valve means actuated by the brake pedal and adapted normally to permit the flow of fluid under pressure to and from the brake cylinder upon operation of the brake pedal, said valve means being so arranged as to be immersed in fluid at all times, a normally inactive piston member associated with the valve means, and means actuated by the brake pedal upon a relatively wide movement thereof for moving the normally inactive piston and developing fluid pressure before it for applying the brake.

3. In a vehicle brake, the combination of means for developing fluid pressure, a brake cylinder, a brake pedal, a valve member communicating with the fluid pressure and actuated by the brake pedal, a second valve member cooperating with the first mentioned valve member and having cooperating ports and passages adapted normally to permit the flow of fluid under pressure to and from the brake cylinder upon operation of the brake pedal, both of said valve members being so arranged as to be substantially immersed in fluid at all times, a normally inactive piston member associated with the valve members, and means actuated by the brake pedal upon a relatively wide movement thereof for moving the normally inactive piston and developing fluid pressure before it for applying the brake.

4. In a hydraulically operated vehicle brake, the combination of a brake cylinder having a piston for applying and releasing the brake, a fluid reservoir, a pump associated with the reservoir for developing fluid pressure, a valve housing, a conduit leading from the pump to the housing for conveying fluid under pressure to said housing, a second conduit leading from the housing to the brake cylinder, a brake pedal, a spring for normally holding the pedal in a definite position, an inner sleeve valve member located in the housing and having a series of admission ports and a series of exhaust ports extending through its walls to the interior thereof in communication with the brake cylinder, a piston connected to one end of the inner valve member greater in area than the valve member and subjected to the brake cylinder pressure, a spring associated with the piston and opposing the brake cylinder pressure, a substantially fluid tight closure member for the other end of the inner valve member and slidingly fitting therein, an outer sleeve valve member actuated by the brake pedal and telescoping over the inner valve member, said outer valve member having a series of ports formed therein in communication with the fluid under pressure and adapted upon slight movement of the outer valve member to register with the admission ports of the inner valve member and permit the flow of fluid under pressure to the brake cylinder and upon further movement to be moved out of registry with the admission ports of the inner valve member, and a boss formed on the outer valve member adapted upon a failure of pressure and a definite movement of the outer valve member to engage with the closure member of the inner valve member and exert a pressure on the fluid ahead of it and in the brake cylinder.

5. In a hydraulically operated vehicle brake embodying a pressure chamber with a movable wall for applying and releasing the brake, the combination of a source of fluid pressure, a pressure transformer device interposed between the source of fluid pressure and the pressure chamber for delivering fluid pressure to said chamber and releasing fluid therefrom and so disposed as to have its working parts substantially immersed in fluid at all times, an operating element for the transformer device, a normally inactive piston element included in the transformer device and means actuated by the operating element upon failure of pressure at the source for engaging the piston element and developing a pressure thereby for the brake cylinder.

6. In a hydraulically operated vehicle brake embodying a fluid reservoir and means associated with the reservoir for developing fluid pressure, the combination of a brake cylinder for applying and releasing the brake, operating means for controlling the brake, a pressure transformer device having a valve member connected to the operating means and effective normally to deliver fluid under pressure to the brake cylinder upon actuation by the operating means, a normally inactive piston member included in the transformer device and having fluid at all times on one side thereof, resilient means for normally holding the piston member in its inactive position, and means carried by the valve member for engaging the piston member upon failure of pressure and actuation of the operating means whereby fluid pressure is developed by the piston member for the brake cylinder.

7. In a fluid pressure transformer device for a hydraulically operated brake, the combination of cooperating valve members effective normally upon movement in one direction relative to each other to deliver a pressure from the transformer device determined by the range of said movement, and means coacting between the valve members whereby upon overtravel relative to each other in the one direction braking pressure is developed in the transformer device upon the exertion of force on one of said valve members.

8. In a fluid pressure transformer device for a hydraulically operated brake, the combination of cooperating valve members effective normally upon movement in one direction relative to each other to deliver a pressure from the transformer device determined by the range of movement of the valve members, operating means for one of said valve members and means coacting between the said valve members whereby upon the exertion of force on the operating means and overtravel of the valve members relative to each other braking fluid pressure is developed in the transformer device.

9. In a fluid pressure transformer device for a hydraulically operated brake, the combination of a pair of cooperating valve members substantially immersed in fluid and normally effective upon movement relative to each other in one direction to deliver a pressure from the transformer device determined by the range of movement of the valve members, operating means for one of the valve members, a piston member carried by the other valve member and having fluid on one side thereof in the transformer device, and means carried by the first valve member adapted upon overtravel relative to the second valve member to engage the piston member and move it in a direction for developing pressure upon the exertion of force upon the operating means.

10. In a fluid pressure transformer for a hydraulically operated vehicle brake, the combination of a pair of cylindrical shaped valve members telescoping with each other and substantially immersed in oil, operating means connected to the outer valve member, said valve members having ports and passages provided therein adapted to register upon relative movement of the valve members in one direction and deliver fluid under pressure from the transformer device, a piston connected to the inner valve member and subjected to the pressure delivered, a spring associated with the piston for opposing said pressure and moving the ports of the inner valve member out of registry with the ports of the outer valve member, a piston like fluid tight closure member for one end of the inner valve member, and means carried by the outer valve member for engaging the closure member and developing pressure in the transformer device upon overtravel of the valve members in the direction for registry of the ports and upon the exertion of force on the operating means.

11. In a hydraulically operated vehicle brake, a brake cylinder, a source of fluid pressure above atmospheric, a pair of co-operating valve members for applying and releasing the fluid pressure from the brake cylinder, means directly connected to one of the valve members for moving said valve member to connect the brake cylinder with the source of fluid pressure or with the exhaust, means directly connected to the other valve member and responsive to brake cylinder pressure for moving said other valve member to cut off the flow of fluid to or from the brake cylinder, and a spring having a definite scale opposing movement of the last-mentioned means.

12. In a hydraulically operated vehicle brake, a brake cylinder, a source of fluid pressure above atmospheric, a pair of telescoping valve members having cooperating ports adapted upon registry to apply or release fluid pressure to or from the brake cylinder, manually operable means for moving one of the valve members to place the ports in registry, means responsive to brake cylinder pressure for moving the other valve member to place the ports out of registry, and a spring having a definite scale opposing movement of the last-mentioned means.

13. In a hydraulically operated vehicle brake, a source of fluid pressure, a brake cylinder, an outer sleeve valve member of the balanced type, an inner sleeve valve member telescoping with the outer sleeve valve member, said valve members being provided with cooperating ports adapted on registry to admit or exhaust fluid pressure to or from the brake cylinder, manually operable means for moving the outer valve in one direction to place the ports in registry, a spring for moving the outer valve in the other direction, and means responsive to pressure in the brake cylinder for effecting a follow up movement of the inner valve in either direction, to place the ports out of registry.

In testimony whereof, I have hereunto subscribed my name this sixteenth day of February, 1926.

VICTOR I. ZELOV.